Sept. 11, 1951 W. H. SILVER ET AL 2,567,736
QUICKLY ATTACHABLE IMPLEMENT
Filed Feb. 16, 1945 3 Sheets-Sheet 1

INVENTORS
WALTER H. SILVER
WILLIAM V. LOHRMAN
BY
ATTORNEYS

WITNESS
Clifford Zude

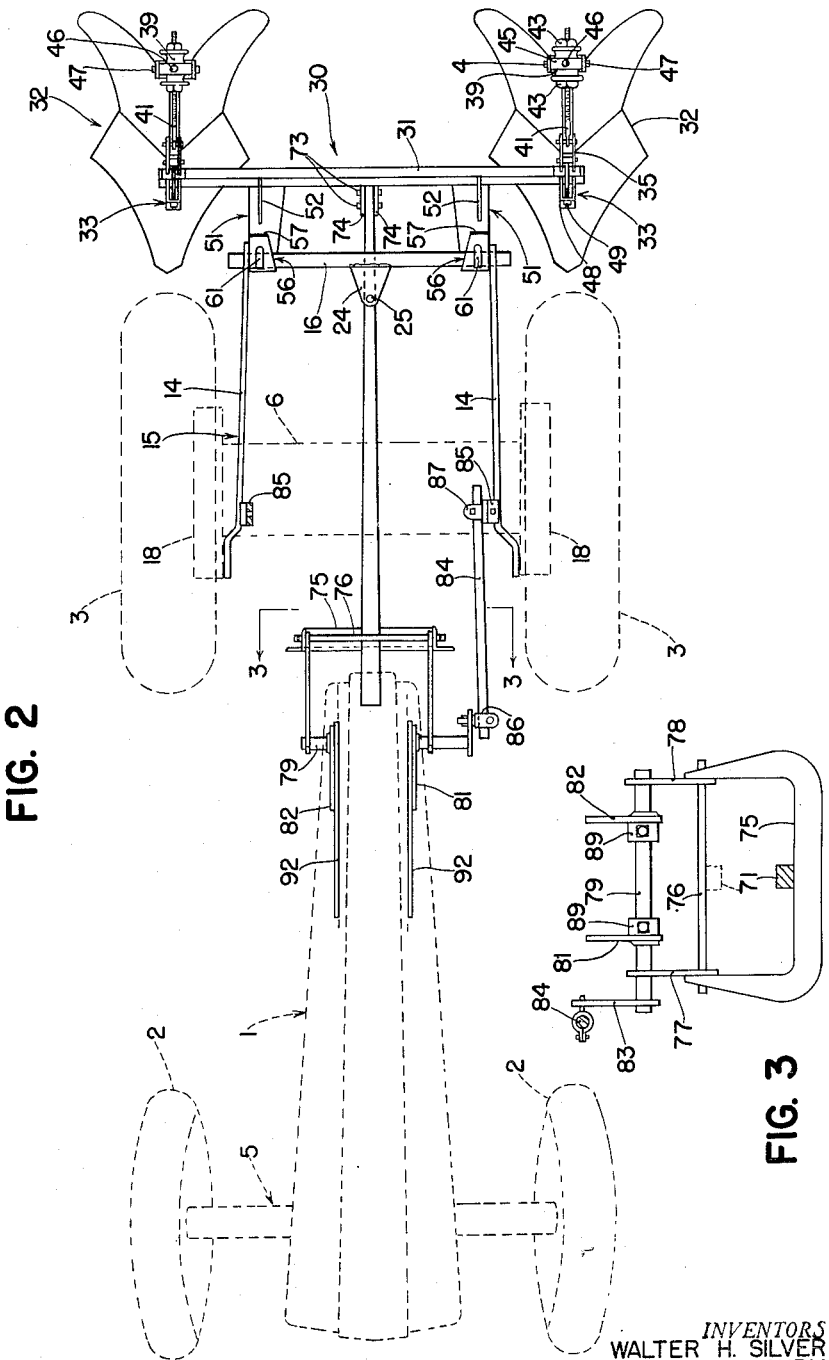

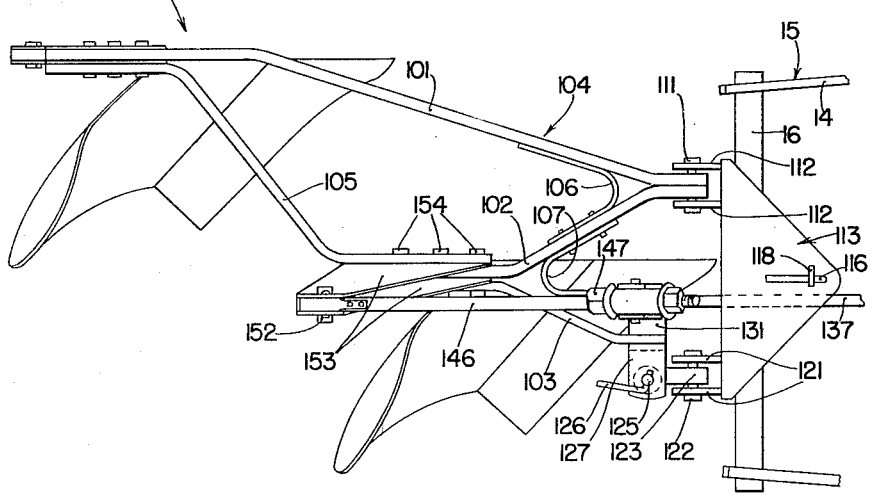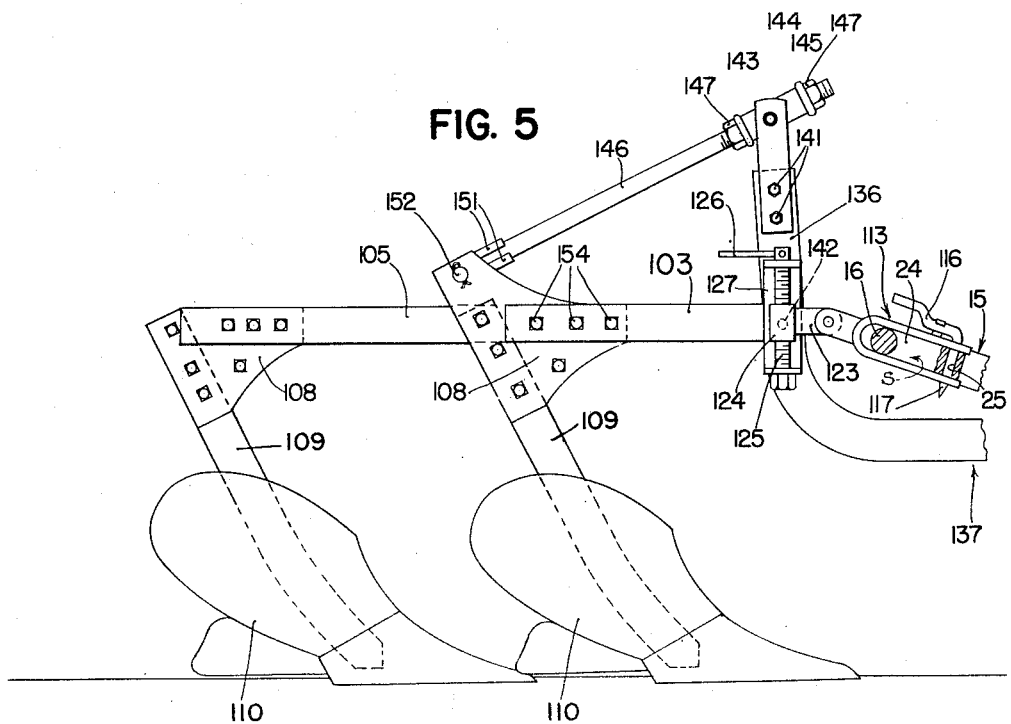

Patented Sept. 11, 1951

2,567,736

UNITED STATES PATENT OFFICE 2,567,736

QUICKLY ATTACHABLE IMPLEMENT

Walter H. Silver, Moline, Ill., and William V. Lohrman, Davenport, Iowa, assignors to Deere & Company, Moline, Ill., a corporation of Illinois Application February 16, 1945, Serial No. 578,148

8 Claims. (Cl. 97—47)

The present invention relates generally to agricultural machines and more particularly to integral or tractor mounted implements.

The object and general nature of the present invention is the provision of a new and improved integral implement which may easily and quickly be attached to or detached from its supporting tractor and in which the implement may be readily attached to the tractor by backing the tractor in position, lowering the tractor drawbar slightly, and then driving forwardly.

More particularly, it is a feature of this invention to provide new and improved depth adjusting means for adjusting the depth of operation of the tools by raising or lowering the front and rear ends of the tool beams substantially the same amount. Another feature of this invention is a provision of quick detachable means for connecting the depth adjusting means with the tractor.

These and other objects and advantages of the present invention will be apparent to those skilled in the art after a consideration of the following detailed description, taken in conjunction with the accompanying drawings in which the preferred forms of the present invention have been illustrated.

In the drawings:

Figure 2 is a plan view of the implement shown in Figure 1, the tractor being indicated in dotted lines in order to show the implement parts more clearly.

Figure 3 is a sectional view taken generally along the line 3—3 of Figure 2.

Figures 4 and 5 are plan and side views, respectively, of a two bottom plow incorporating the provisions of the present invention.

Figure 1:
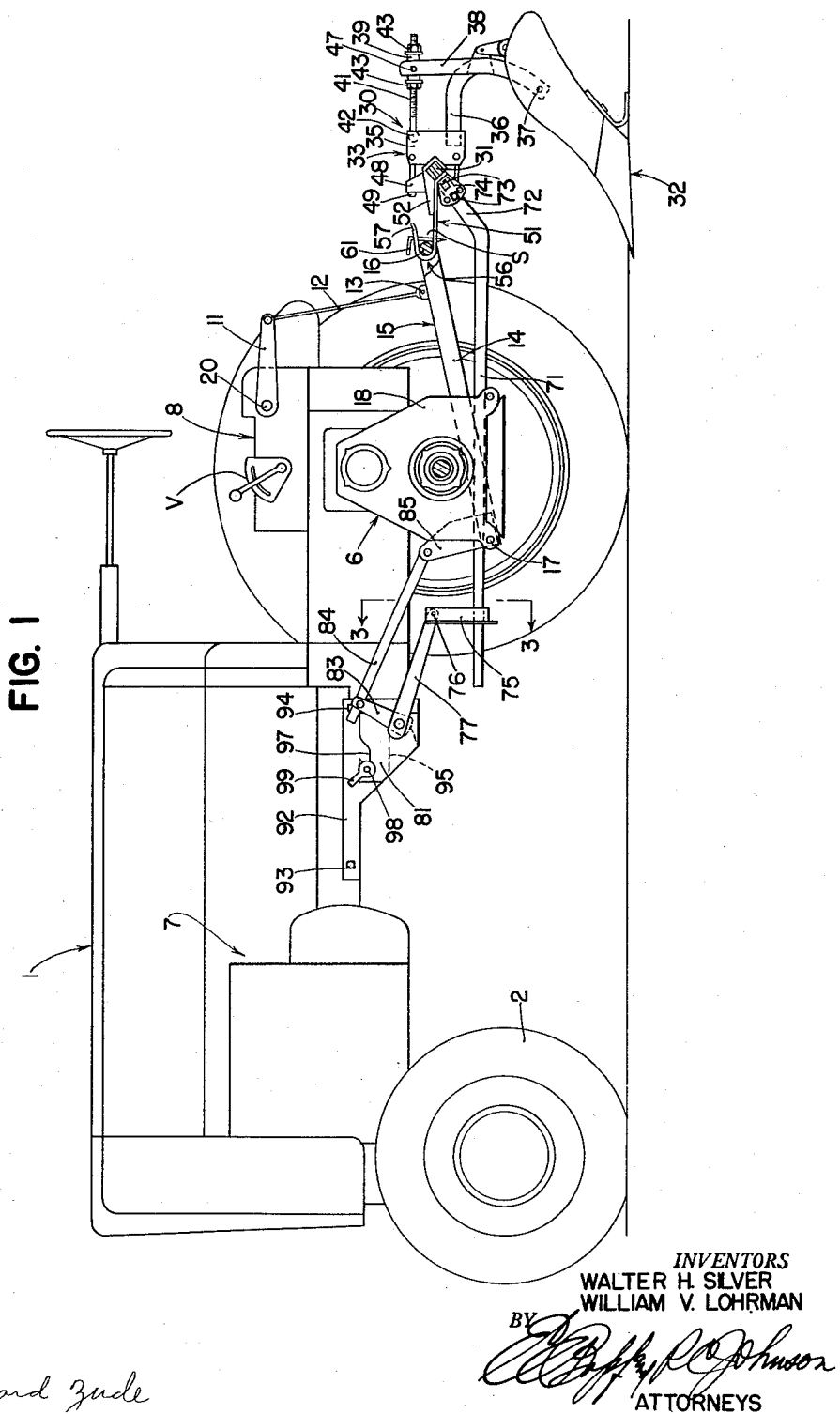
Figure 1 is a side view of a quick detachable implement, such as a two bottom lister, showing the same as mounted in position on its propelling and supporting tractor.

Referring now to the drawings, particularly Figures 1 and 2, the reference numeral 1 indicates a farm tractor of the four wheel type, having front and rear wheels 2 and 3 journaled for rotation on axle means 5 and 6. The tractor includes a power plant 7 and a power lift unit 8 of the hydraulic type, including suitable valve mechanism V and other necessary parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock.

The sides 14 may be strap members, and the latter are pivoted at their front ends, as at 17, to drop housings 18 which form a part of the tractor rear axle structure 6. Preferably, the rear part 16 is welded or otherwise permanently secured to the side parts 14 of the tractor drawbar or bail 15. The two power lift arms 11 are clamped or otherwise fixed in any suitable manner to the ends of a power lift rockshaft 20 which forms a part of the hydraulic unit 8. As best shown in Figure 2, a lug 24 is welded or otherwise permanently fixed to the central section 16 of the tractor drawbar 15 and is apertured, as at 25, to receive certain types of implements, such as the two bottom plow shown in Figures 4 and 5. The two bottom lister shown in Figures 1 and 2 is not attached to the lug 24.

As best shown in Figures 1 and 2, one of the implements that may readily and quickly be attached to and detached from the tractor is a two bottom lister, indicated in its entirety by the reference numeral 30. The implement 30 includes a tool bar 31 extending transversely and at its ends receives standards from lister bottoms 32 firmly and rigidly secured to the tool bar 31 by clamping means 33 and associated parts. As best shown in Figure 1, each clamping unit includes a pair of brackets 35 fixed as by welding or the like to the forward end of a tool standard 36 the lower end of which is pivoted, as at 37, to a pair of upstanding vertical brackets 38 to which the lister bottom 32 is fixed in any suitable manner. The upper ends of the brackets 38 are apertured to receive a trunnion member 39, the latter member receives the rear end of a threaded adjusting rod 41 which is pivoted, as at 42, to the bracket plates 35. Lock nuts 43 fix the trunnion member 39 in different positions of adjustment along the threaded rod 41, whereby the suck of the bottom may be adjusted.

Each trunnion 39 is mounted in suitable brackets 45 for movement relative to the latter about vertical pivots 46, and the brackets are pivoted to the upper ends of the vertical brackets 38 by horizontal pivots 47. The brackets 35 are clamped to the ends of the tool bar 31 by caps 48 and clamping bolts 49.

An attaching member in the form of a forwardly extending bracket 51 is rigidly secured, as by welding, to each end portion of the tool bar 31, as best shown in Figure 2. Each of these brackets is reinforced by a vertical piece 52 welded to the bracket and at its rear end to the forward side of the tool bar 31. The upper edge of each of the pieces 52 slopes downwardly and forwardly, as best shown in Figure 1. Forward of each piece 52 the associated bracket 51 is formed with a rearwardly facing hook portion 56, preferably made by bending the stock of which the bracket 51 is formed over upon itself to form a rearwardly facing socket S and with the end portion of the bent over section flaring upwardly and rearwardly, as indicated at 57. The upper and lower portions of each of the hook sections 56 are apertured to receive a locking pin 61 which serves to hold the rear cross bar 16 of the tractor drawbar 15 in position seated in the hooks 56. Assuming that the implement is resting on the ground, it may readily be attached to the tractor merely by backing the tractor into the implement with the drawbar 15 raised slightly above the position shown in Figure 1, and then after the cross bar 16 is in a position slightly to the rear of the open end of the hooks 56, the drawbar is then dropped and the tractor driven forwardly. The upper edges of the reinforcing braces 52 serve to guide the cross bar 16 into the open ends of the hook portions, it being assumed that the pins 61 were withdrawn previously. After the tractor has been driven forwardly a few inches, the cross bar 16 seats in the hook portions 56, as shown in Figure 1, and then the locking pins 61 are dropped in place behind the cross bar 16, thus locking the implement to the tractor.

A depth adjusting and stabilizing structure is associated with the tools 32 for holding them in the proper position for different depths of operation, it being understood that the drawbar 15 may be raised into different positions by proper actuation of the valve V. However, the drawbar 15 is free to be moved vertically beyond its position of adjustment and to return to that position but not below it. The depth adjusting and stabilizing structure will now be described.

A longitudinal beam or stabilizing bar 71 is bent upwardly, as at 72, at its rear end and is apertured to receive a pair of bolts 73 which serve to fix the bar 71 to the tool bar 31 through a pair of brackets 74 that are welded to the tool bar 31 and extend forwardly thereof in laterally spaced relation so as to receive the rear end of the stabilizing bar 71 therebetween. The bar 71 extends forwardly underneath the rear axle 6 of the tractor and at its forward end rests in a vertically shiftable depth adjusting bail member 75, the upper ends of which, as best shown in Figure 3, are apertured to receive a cross bar 76 that is carried in the rear lower ends of a pair of arms 77 and 78 which at their upper or forward portions are welded or otherwise suitably fixed to a cross shaft 79. The latter is supported in suitable bearing brackets 81 and 82 and at one end has an arm 83 fixed thereto and connected by a link 84 to an arm 85 formed on the right side member 14 of the tractor drawbar bail 15. Connection between the front end of the link 84 and the arm 83 is effected by means of a clamping swivel 86, and a similar clamping swivel 87 serves to connect the rear end of the link 84 with the upper end of the arm 85. The cross shaft 79 is held in the desired lateral position with respect to the bearing brackets 81 and 82 by clamp collars 89.

The two bearing plates 81 and 82 are adapted to be readily and quickly attachable to and detachable from the tractor 1, preferably the intermediate portion thereof forward of the rear axle 6. To this end, the tractor carries a pair of attaching plates 92, bolted to the tractor, as at 93 and 94. Each of the attaching plates 92 is provided with a forwardly facing notch 95 (shown in dotted lines in Figure 1) which is adapted to receive the cross shaft 79, the upper and lower edges of the notch 95 flaring downwardly and forwardly to facilitate movement of the shaft 79 and associated parts into position. Also, each of the bearing brackets 81 and 82 is provided with a rearwardly facing notch 97 which is adapted to receive a stud 98 carried by the associated tractor attaching bracket 92, each stud 98 receiving a wing nut 99.

The operation of the above described embodiment of this invention is substantially as follows.

Figure 1 shows the parts in operating position, and it will be noted that as the outfit moves forwardly, the pressure of the soil against the lifter bottoms 32 tends to cause the tool unit, which includes the bottoms 32, the stabilizing bar or longitudinal beam 71 and associated parts, to tend to swing about the axis defined by the rear cross bar member 16 on the tractor bail or drawbar 15. This movement is, however, restrained by the engagement of the front end of the bar 71 in the depth adjusting or vertically swingable bail 75. The position of the latter depends upon the position of the tractor drawbar or bail 15, since they are linked together by the links 84 and associated parts, as best shown in Figure 1. If it should be desired to cause the lister bottoms 32 to operate at increased depth, the valve mechanism V is operated so as to permit the bail 15 to lower the desired amount. The lowering of the bail 15 exerts a pull on the links 84 which, in turn, serves to lower the front or depth adjusting bail 75, and the connections are so arranged that the bail 75 is lowered, or raised, substantially the same as the cross bar 16 of the tractor drawbar 15, whereby the position of the tool is changed as desired but the tool is moved into different parallel positions relative to the tractor. It will be noted that the front end portion of each lister bottom is disposed substantially underneath the cross bar 16 of the draft bail. This arrangement has the advantage that the downward thrust or pressure of the soil against the tools 32 does not cause the front end of the longitudinal bar 71 to tip up, whereas the bar 16 being a considerable distance above the tools 32 the rearward pressure of the soil against the tools serves to hold the front end of the longitudinal stabilizing bar 71 down against its supporting bail 75.

When it is desired to lift the tool into a transport position the valve V is operated to cause the power lift arms 11 to be swung upwardly. Since the greater weight of the tools lies rearwardly of the bar 16, the first effect of the lifting action is to raise the front end of the stabilizing bar 71 upwardly until it contacts the upper pivot bar 76 (see dotted line position of the bar 71 in Figure 3). After this contact is established the further upward movement of the lifting arms 11 serves to raise the entire implement, but the upward movement of the front end of bar 71 has the advantage that in the first part of the lifting action the lister bottoms 32 are tipped upwardly so as to aid and accelerate their running out of the ground. When first lowering the tools into the ground to start operation, the front end of the bar 71 remains in contact with the bar 76 until the rearward pressure of the soil against the lower portions of the tools 32 serves to swing the bar 71 down against the bail 75 in its normal position. The brackets 74, connecting the rear end of the bar 71 with its tool bar 31, are provided with a number of apertures so that the bar 71 may be fixed to the tool bar in different relative positions, and likewise the upper ends of the lister bottom brackets 38 may be adjusted longitudinally of the screw threaded rod or bolt 41 associated therewith.

The present invention is not necessarily limited to a tool bar implement or to a two bottom lister or the like. We have shown in Figures 4 and 5 a two bottom moldboard plow especially constructed and arranged to be mounted on the tractor 1 and to be associated with the tractor drawbar 15 and the depth adjusting bail 75 and associated parts in much the same manner as the two bottom listers shown in Figures 1 and 2.

Referring now to Figures 4 and 5, a two bottom plow of the quick attachable type is indicated in its entirety by the reference numeral 100 and comprises plow beam members 101, 102 and 103, suitably connected together to form a plow frame 104. The frame 104 also includes suitable braces 105, 106 and 107. Secured to the rear end of each of the plow beams 101 and 102 is a downwardly and forwardly extending standard 109 to which a moldboard plow bottom 110 is attached in any suitable way. A bracket structure 108 serves to fix each standard 109 to the associated plow beam.

The two left hand plow beam members 101 and 102 are formed to converge forwardly, as best shown in Figure 4, and their forward converged ends are apertured to receive a pivot pin 111 which extends through a pair of lugs 112 welded or otherwise secured to a saddle member 113. The latter member is formed preferably of flat stock bent over onto itself in generally U-shaped configuration, as best shown in Figure 5, and the stock is trimmed so as to form a generally triangular structure, as shown in Figure 4. The forward apex section of the saddle member 113 is apertured to receive a detachable hitch pin 116, the hitch pin including a lower end section 117 adapted to pass downwardly through the openings in the saddle member 113 and the opening 25 (Figure 2) in the bracket member 24 that is secured to the tractor drawbar member 16. A spring clip 118 serves to retain the hitch pin 116 in position. A second pair of rearwardly extending lugs 121 is fixed to the rear side of the saddle member 113 and receives a pivot pin 122 that passes through an apertured ear 123 formed on and extending forwardly of a vertically adjustable lug 124. The latter member is internally threaded to receive a leveling screw 125 which is rotated by a handle 126 and is held for rotation in a vertical U-shaped bracket 127. The bracket 127 is fixed to the forward end of the right hand plow beam member 103, as best shown in Figure 4. A laterally inwardly extending bracket 131 is also fixed to the front end of the right hand plow beam member 103 and receives a pivot 142 that extends in a transverse direction through an opening in the rear upturned end 136 of a longitudinally extending bar or stabilizing member 137. The front end of the stabilizing bar 137 is formed like the bar 71 shown in Figures 1 and 2 and is adapted to be carried in the depth adjusting bail 75 on the tractor. The rear upturned end 136 of the stabilizing member 137 is apertured to receive a pair of bolts 141 which secure to the bar 137 a pair of spaced brackets 143 which are apertured to receive the trunnions 144 of a sleeve member 145. The forward threaded end of an adjusting strut 146 passes through the sleeve 145 and receives a pair of lock nuts 147 thereon. The rear end of the strut or link 146 receives a pair of pivot clamps 151 which are connected by a pivot pin 152 to a pair of generally outwardly offset upwardly extending bracket plates 153, the lower portions of which are secured by the same bolts 154 that fasten the two plow beam members 102, 103 and the brace 105 together.

The two bottom plow shown in Figures 4 and 5 is attached to and detached from the tractor in substantially the same way as described above in connection with the two bottom lister shown in Figures 1 and 2, except that the saddle member 113 forms a forwardly facing socket s instead of a rearwardly facing socket, as provided by the rearwardly facing hook portions 56. Therefore, when attaching the plow shown in Figures 4 and 5, the tractor is backed with the drawbar 16 disposed in a position to enter between the upper and lower portions of the saddle member 113, after which the hitch pin 116 may then be placed in the apertured portions of the saddle member 113 and the forward apertured lug 24 of the tractor drawbar. The relative angular position of the stabilizing member 137 relative to the plow frame may be adjusted by loosening one of the lock nuts 147 and tightening the other, thereby shifting the sleeve 145 along the strut 146 in one direction or the other and thus pivoting the plow frame about its pivotal connection with the longitudinal stabilizing bar 137. The plow may be leveled by turning the adjusting screw 125 (Figure 5) in one direction or the other.

The operation of the two bottom plow shown in Figures 4 and 5 is substantially the same as the operation of the two bottom lister described above in detail. It is to be noted, however, that where no leveling is necessary for the two bottom lister, leveling is provided for by the construction of the two bottom plow shown in Figures 4 and 5. The operation of both implements is such that uniform depth of operation is normally maintained even though the tractor may pass over uneven ground. For example, it will be remembered that the tractor drawbar 15 and its connections are so arranged that the drawbar 15 in any position of adjustment may move momentarily upwardly out of that position and then downwardly back to that particular position without material restraint. Thus, in case the front wheels 2 of the tractor pass over a ridge or the like the upward tilting of the front end of the tractor does not force the tools down into the ground beyond normal depth because under the conditions just assumed the tractor drawbar 15 momentarily rises with respect to the rear end of the tractor. Likewise, if the front wheels 2 of the tractor should drop into a hole or the like, the rear drawbar 15 is, of course, pulled upwardly, since it cannot move downwardly with respect to the tractor, but this does not pull the tools out of the ground to any appreciable extent since the front end of the stablizing bar 71 merely rises momentarily to the upper cross bar 76 (dotted lines Figure 3). This action, although momentary, minimizes the variation in the depth of operation of the tools in the event the front wheels of the tractor drop into a depression.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a tractor mounted implement adapted to be mounted on a tractor having a vertically swingable bail, a vertically swingable drawbar rearwardly of said bail, means on the tractor for swinging the bail and drawbar, said implement comprising a generally longitudinal beam extending generally forwardly relative to the tractor and carrying a ground working tool at its rear end, a transverse part on the rear portion of said beam, socket means on said transverse part for detachably receiving the rear portion of said drawbar and adapted to be raised and lowered by raising and lowering said drawbar, the forward portion of said beam resting in said bail and freely withdrawable therefrom by longitudinal movement of the bail relative to the front end of said beam, and said socket means being open at one side facing in a fore and aft direction whereby said socket means is releasable from said tractor drawbar by longitudinal movement of the drawbar relative to the beam.

2. In an agricultural implement adapted to be attached to a tractor having a vertically swingable drawbar, a vertically shiftable part-receiving member carried by the tractor forward of said drawbar, and means on the tractor for swinging said member and drawbar, said agricultural machine including a ground working tool, socket means carried by said tool and adapted to receive the rear portion of said drawbar and to be raised and lowered by raising and lowering of said drawbar, said socket member being open at one portion so as to be freely removable from or connectible to the rear portion of said bail, said tool including a part extending generally forwardly underneath the tractor and rigidly connected with said tool, and the forward end of said part being adapted to rest in said part-receiving member and disconnectible therefrom merely by withdrawing said forward end therefrom 3. An implement adapted to be connected with a tractor having a vertically swingable generally U-shaped bail member, said implement being adapted to be connected to the bail member of said tractor and including a pair of forwardly extending hook portions, each having vertically spaced sections joined forwardly and spaced apart rearwardly with the lower section connected with said implement so that said tractor may be backed into the implement and the rear portion of said bail member lowered into a position rearwardly of the open ends of said hook portions, into substantial contact with the lower connecting sections thereof, and then driven forwardly to engage the tractor bail in said hook portions.

4. An agricultural implement for use with a tractor having a generally vertically swingable bail pivoted to the rear portion of the tractor and a depth control unit mounted forward of said bail, said implement comprising a transverse tool bar, tools fixed thereto, a pair of forwardly extending hook members fixed at their ends to said tool bar and carrying hook-like sections the open ends of which face rearwardly but positioned forwardly of said tool bar, said bail on the trac or being adapted to be engaged in between said hook sections by first backing the tractor, then lowering the bail into substantial engagement with said forwardly extending hook members and then driving the tractor forwardly to bring the tractor bail into seating relation between said hook-like sections, and a member rigidly connected at its rear end to said tool bar, the forward end of said last mentioned member being received by said depth control unit whereby operation of the latter controls the position of said tools.

5. A two row lister adapted to be mounted on a tractor having a rear vertically swingable drawbar bail and a forwardly disposed bar-receiving member swingably mounted on the tractor for generally vertical movement and interconnected with said bail, said two row lister comprising frame means including a generally forwardly extending bar adapted to be removably seated in said vertically movable tractor-carried member and a transverse bar rigidly fixed to the rear end of said forwardly extending bar, a pair of lister bottoms fixed to the end portions of said transverse bar, and means for detachably connecting said transverse bar with the rear tractor drawbar including a pair of laterally spaced sockets connected with said transverse bar and open at one side so as to receive the transverse portion of said rear tractor drawbar, said implement being detached from the tractor by moving the same longitudinally so as to disengage the transverse portion of said swingable bail from the associated laterally spaced socket members and to disconnect the front end of said fore and aft extending bar from said vertically movable member.

6. The invention set forth in claim 5, further characterized by the tractor drawbar having side members and said socket sections being spaced apart so as to engage the inner faces of said side members for limiting the lateral displacement of said transverse bar and lister bottoms relative to the tractor.

7. An implement adapted to be mounted on a tractor having a rear vertically swingable drawbar bail and a forwardly disposed bar-receiving member swingably mounted on the tractor for generally vertical movement and interconnected with said bail, said implement comprising frame means including a generally forwardly extending bar adapted to be removably seated in said vertically movable tractor-carried member and a transverse bar rigidly fixed to the rear end of said forwardly extending bar, tool means connected to said transverse bar and extending at opposite sides of said bar, and means for detachably connecting said transverse bar with the rear tractor drawbar including a pair of laterally spaced sockets connected with said transverse bar and open at one side so as to receive the transverse portion of said rear tractor drawbar, said implement being detached from the tractor by detaching said transverse bar and moving the tractor longitudinally away from the implement so as to disengage the transverse portion of said swingable bail from the associated laterally spaced socket members and to disconnect the front end of said fore and aft extending bar from said vertically movable member.

8. An implement adapted to be connected with a tractor having a vertically swingable, generally U-shaped bail member, said implement being adapted to be connected to the bail member of said tractor and including a pair of fore and aft extending hook portions, each having vertically spaced sections joined at their forward ends and spaced apart at their rear ends, with the lower section connected with said implement so that said tractor may be backed into the implement and the rear portion of said bail member lowered into a position rearwardly of the open ends of said hook portions, into substantial contact with the lower sections thereof, and then driven forwardly to engage the tractor bail in said hook portions.

WALTER H. SILVER.
WILLIAM V. LOHRMAN.

REFERENCES CITED

The following references are of record in the file of this patent:

UNITED STATES PATENTS

| Number | Name | Date |
|---|---|---|
| 1,200,107 | Heylman | Oct. 3, 1916 |
| 1,817,085 | Lindgren et al. | Aug. 4, 1931 |
| 2,292,961 | Mott | Aug. 11, 1942 |
| 2,319,670 | Ego | May 18, 1943 |
| 2,320,168 | Benjamin et al. | May 25, 1943 |
| 2,339,225 | Strandlund | Jan. 11, 1944 |
| 2,352,491 | Orelind | June 27, 1944 |
| 2,358,282 | Ray | Sept. 12, 1944 |
| 2,414,114 | Martin | Jan. 14, 1947 |
| 2,416,194 | Miller | Feb. 18, 1947 |

FOREIGN PATENTS

| Number | Country | Date |
|---|---|---|
| 158,712 | Great Britain | Feb. 14, 1921 |
| 189,998 | Great Britain | Dec. 14, 1922 |